UNITED STATES PATENT OFFICE.

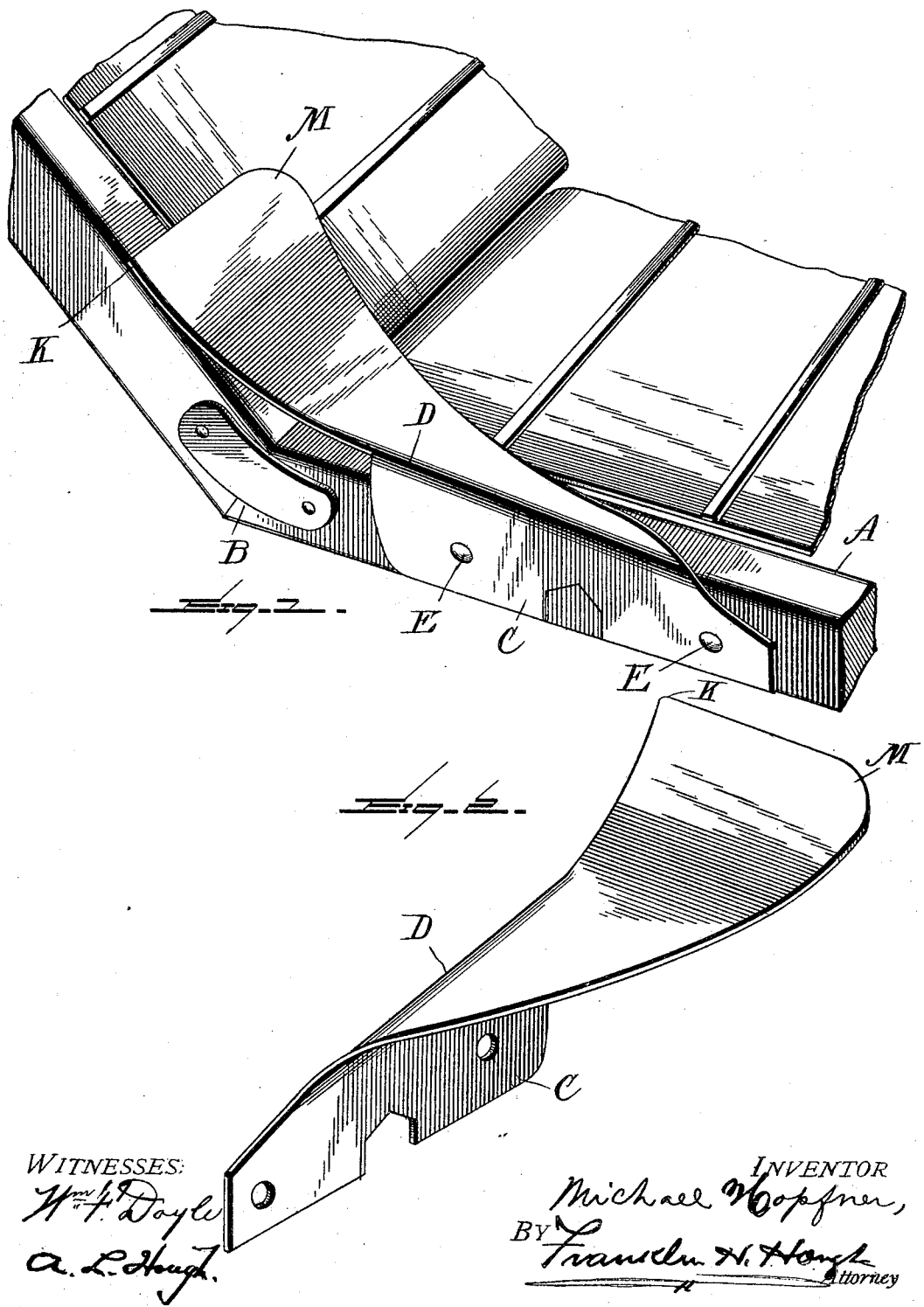

MICHAEL HOPFNER, OF FOSSTON, MINNESOTA.

HARVESTER ATTACHMENT.

SPECIFICATION forming part of Letters Patent No. 696,442, dated April 1, 1902.

Application filed November 7, 1901. Serial No. 81,513. (No model.)

*To all whom it may concern:*

Be it known that I, MICHAEL HOPFNER, a citizen of the United States, residing at Fosston, in the county of Polk and State of Minnesota, have invented certain new and useful Improvements in Harvester Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in harvester attachments, and particularly to a device which is adapted to be secured to the platform of a harvester in the rear of the finger-bar and having a projecting wing which is adapted to be held over the edge of the endless apron or carrier and designed for the purpose of preventing tangled grains, gumming flax, &c., from clinging to the canvas of the carrier, and is especially useful in connection with canvas carriers which have become somewhat worn from usage.

The invention will be hereinafter more fully described and then specifically defined in the appended claim, and is illustrated in the accompanying drawings, in which I have shown in—

Figure 1 a perspective view of my attachment shown as fastened to the platform of a harvester. Fig. 2 is an enlarged detail view of the device.

Reference now being had to the details of the drawings by letter, A designates the platform of a harvester, and to the cross-piece B is fastened my attachment C, which is made, preferably, of metal, either cast or malleable. Said attachment has a vertically-disposed part, which is secured by means of screws E to said cross-piece, while its upper portion is bent at right angles, as at D, and its free end rearwardly extending and curving upward, as shown, said projecting portion widening from the angled portion and having one angled corner K and the opposite corner M rounded, as shown. When this device is attached to a harvester-platform, said projecting portion will be located adjacent to the canvas apron, whereby any tangled grain which would be liable to become caught in the canvas is prevented from so doing by means of the attachment, which keeps the edge of the canvas clear of such grain which is likely to become attached to the ragged edges of canvases which are worn by long usage.

It is my purpose to attach this device to harvesters of various kinds, the particular shape shown in the drawings being adapted specially for the Deering harvester; but it will be understood that the attachment is applicable to various forms of construction of harvesters, in connection with some of which slight variations of construction of attachment will have to be made. Such variations, however, may be made to adapt the attachment for various uses without departing from the spirit of my invention.

Having thus described my invention, what I claim to be new, and desire to secure by Letters Patent, is—

In combination with a harvester-platform, an attachment made of metal having a vertically-disposed portion of said attachment fastened to said platform, the top of the attachment being bent at right angles and having the end projecting toward the endless carrier of the harvester, said projecting portion being concave and widening toward its free end, adapted to prevent tangled or other grain catching in the edge of the canvas carrier, as set forth.

In testimony whereof I hereunto affix my signature in presence of two witnesses.

MICHAEL HOPFNER.

Witnesses:
W. E. BLACK,
P. E. WESTERDAHL.